L. E. MORROW.
VEHICLE SPRING.
APPLICATION FILED MAY 11, 1916.
1,212,987.
Patented Jan. 16, 1917.
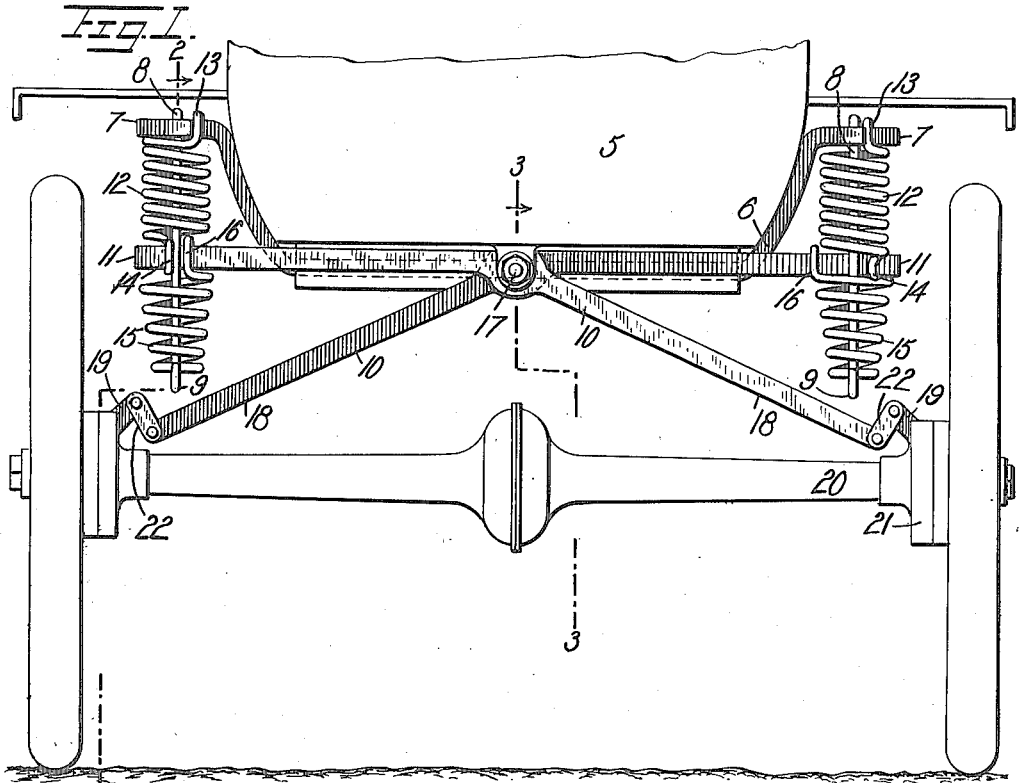
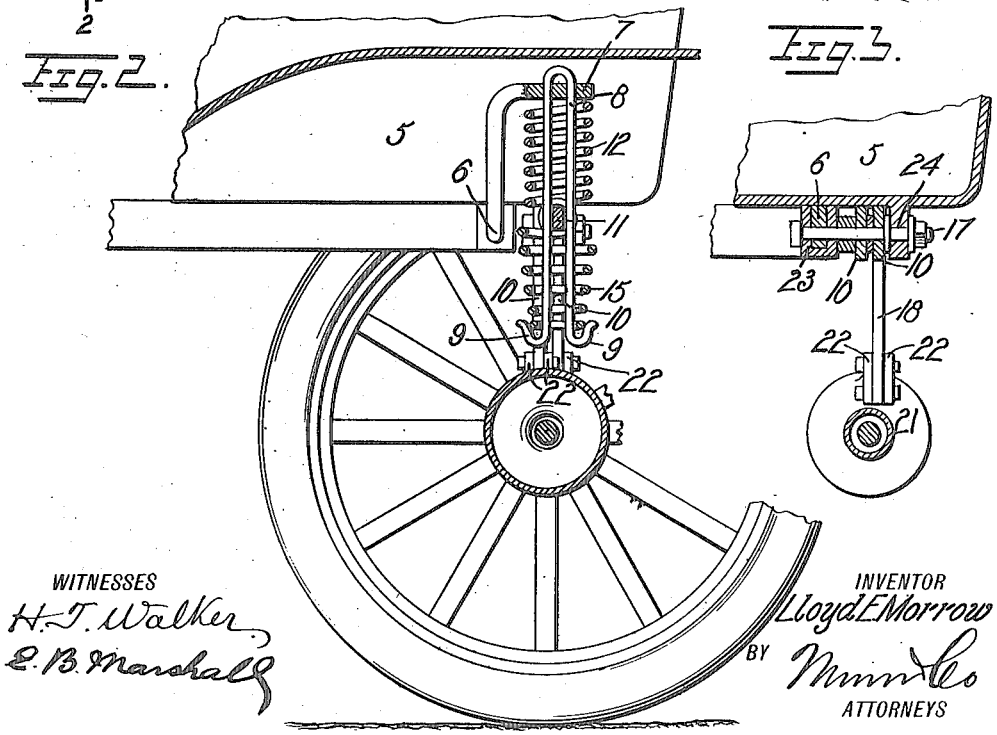
WITNESSES
H. T. Walker
E. B. Marshall
INVENTOR
Lloyd E. Morrow
BY
Munn & Co
ATTORNEYS

UNITED STATES PATENT OFFICE.

LLOYD E. MORROW, OF SANFORD, FLORIDA.

VEHICLE-SPRING.

1,212,987.

Specification of Letters Patent.

Patented Jan. 16, 1917.

Application filed May 11, 1916. Serial No. 96,807.

*To all whom it may concern:*

Be it known that I, LLOYD E. MORROW, a citizen of the United States, and a resident of Sanford, in the county of Seminole and State of Florida, have invented a new and Improved Vehicle-Spring, of which the following is a full, clear, and exact description.

My invention has for its object to provide a vehicle spring with equalizing levers, each of which is connected to an axle at one side of the vehicle, and by means of a spring is connected to the body at the opposite side, so that when an end of the axle is raised at one side of the vehicle, by contact of a wheel mounted on the axle with an obstruction, it will have a tendency, through a lever and one of the springs, to draw the body down at the other side of the vehicle, which will be equalized by the spring at the first mentioned side of the vehicle, which connects the body with a similar lever. The springs at one side of the vehicle body act on the springs at the other side of the vehicle body, to prevent the tilting of the vehicle body under different conditions.

Still other objects of the invention will appear in the following specification, in which the preferred form of my invention is described.

In the drawings, similar reference characters denote similar parts in all the views, in which—

Figure 1 is a fragmentary view of a vehicle provided with my improvement; Fig. 2 is a sectional view on the line 2—2 of Fig. 1; Fig. 3 is a sectional view on the line 3—3 of Fig. 1.

By referring to the drawings, it will be seen that a body 5 is supported on a cradle 6, the cradle 6 having offset portions 7 to which are secured U-shaped bolts 8, the said U-shaped bolts depending from the offset portions 7 of the cradle 6, as best illustrated in Fig. 2 of the drawings. These U-shaped bolts are provided with hooked terminals 9 at their lower ends. Disposed below the vehicle body 5, there are transversely disposed equalizing levers 10, the said levers 10 having arms 11 which are disposed between the parts of the U-shaped bolts, as illustrated in Fig. 2 of the drawings. Disposed around the U-shaped bolts, between the offset portions of the cradle 6 and the lever arms 11, there are expansion springs 12, which are secured to the offset portions 7 at 13, and to the lever arms 11 at 14. It will, therefore, be seen that with the downward movement of a lever arm 11, it will act against the tension of a spring 12, serving however, to draw downward the offset portion 7 to which the said spring 12 is secured, the said downward movement of the offset portion 7 having a tendency to rock the cradle 6, which tendency, however, is offset by the offset portion 7, the lever arm 11, and the spring 12 at the other side of the vehicle body 5.

Disposed below the lever arms 11, there are conical compression springs 15 which are disposed around the U-shaped bolts 8, the said conical compression springs 15 being secured to the lever arms 11 at 16, the springs 15 seating against the hooks 9 when they are compressed. These conical compression springs 15 are so adjusted that they will not function under normal conditions, when the springs 12 are sufficient to answer all requirements but when unusual conditions are met, the compression springs 15 operate, and serve as shock absorbers.

The two transversely disposed equalizing levers 10 are pivoted together at 17, the arms 18 of the levers 10 being disposed at obtuse angles relatively to the arms 11, the said arms 18 being connected with brackets 19 secured to an axle 20 at 21 by links 22, the axle 20 serving as a supporting member.

It will be understood that should one of the wheels mounted on the axle 20 be raised by contact with a road obstruction, it will serve to raise the arm 18 connected with that side of the axle 20 by means of the bracket 19 and the link 22, this upward movement of the arm 18 serving to move downwardly the arm 11 on the same lever at the other side of the vehicle body. This downward movement of the arm 11 of the said lever will cause the spring 12 connected therewith to function, which will tend to move downward therewith the offset portion 7 of the cradle 6, but this downward movement of the said offset portion 7 will act on the cradle 6 to tilt the said cradle and move upwardly the offset portion 7 thereof at the side of the vehicle on which the wheel is mounted which contacted with the obstruction, as set forth. It will, therefore, be seen that as this upward movement of the last mentioned offset portion 7 of the cradle 6 is retarded under normal conditions by the spring 12 connected therewith, and under abnormal conditions by the compression spring 15 disposed thereunder, the vehicle body 5 will not only be held yieldingly suspended, but it will also be held in an upright position under all conditions by means of the action of the springs at the sides of the vehicle body, in the manner set forth. The bolt as 17 pivoting the levers 10 together is disposed in a bearing 23 in the cradle 6 and in a bearing 24 depending from the body 5.

Having thus described my invention, what I claim as new, and desire to secure by Letters Patent, is:

1. In a vehicle spring, a vehicle body, vertically disposed springs one connected to each side of the body, an axle, and two transversely disposed supporting means connected with the axle one at each side of the vehicle body, each supporting means having a horizontal arm disposed in engagement with a spring at the side of the body which is opposite the side at which it is connected with the axle.

2. In a vehicle spring, a vehicle body, vertically disposed springs one connected to each side of the body, an axle, and transverse levers of the first class having one set of arms connected with the ends of the axle and their other arms disposed horizontally and engaging the springs for the purpose specified.

3. In a vehicle spring, a vehicle body, springs one connected to each side of the body, an axle, and two transverse levers of the first class pivoted together substantially at the central longitudinal line of the vehicle body and having one set of arms connected with the ends of the axle and their other arms connected with the springs for the purpose specified.

4. In combination with an axle and a vehicle body, two vertical springs connected with the vehicle body one at each side, two transverse levers of the first class, means connecting one set of arms of the levers with the ends of the axle, the other set of lever arms being disposed horizontally and engaging the springs.

5. In combination with a vehicle body and an axle, a cradle in which the body is supported and having horizontally disposed offset portions, two transverse levers, means connecting one set of arms of the levers with the ends of the axle, the other arms being disposed horizontally, and springs disposed between and connecting the said other arms of the levers and the said offset portions of the cradle.

6. In combination with a vehicle body and an axle, a cradle in which the body is supported and having horizontally disposed offset portions, two transverse levers, links connecting one set of arms of the levers with the ends of the axle, the other arms of the levers being disposed horizontally, and springs disposed between and connecting the said other arms of the levers and the offset portions of the cradle.

7. In combination with a vehicle body and an axle, a cradle in which the body is disposed, two transverse levers of the first class pivoted together substantially at the central longitudinal line of the vehicle body, means connecting one set of arms of the levers with the ends of the axle, and springs disposed between and connecting the other arms of the levers with the cradle.

8. In combination with an axle and a vehicle body, a cradle in which the body is suspended, two transverse levers, means connecting one set of arms of the levers with the ends of the axle, bolts mounted on the cradle at the sides of the body, and springs disposed around the bolts and connected with the cradle and the levers.

9. In combination with a vehicle body and an axle, a cradle in which the body is suspended, two transverse levers, means connecting one set of arms of the levers with the ends of the axle, bolts mounted on the cradle at the sides of the body and extending beyond the other arms of the levers, expansion springs disposed around the bolts and connected with the cradle and the levers, and compression springs disposed around the bolts beyond the levers and secured at one set of ends to the bolts, and connected at their other ends with the levers for the purpose specified.

10. In combination with a vehicle body and an axle, a cradle in which the body is suspended, two transverse levers, means connecting one set of arms of the levers with the ends of the axle, U-shaped bolts secured to the cradle at the sides of the body, the other arms of the levers being disposed between the parts of the U-shaped bolts, and springs disposed around the bolts and connected with the cradle and the levers.

11. In combination with a vehicle body and an axle, a cradle in which the body is suspended, two transverse levers pivoted together, means connecting one set of arms of the levers with the ends of the axle, U-shaped bolts secured to the cradle at the sides of the body, the other arms of the levers being disposed between the parts of the U-shaped bolts, and springs disposed around the bolts and connected with the cradle and the levers.

12. In combination with a vehicle body and an axle, a cradle in which the body is suspended, two transverse levers, means connecting one set of arms of the levers with the ends of the axle, U-shaped bolts secured to the cradle at the sides of the body, the other arms of the levers being disposed between the parts of the U-shaped bolts, expansion springs disposed around the bolts and connected with the cradle and the levers, and compression springs disposed around the bolts beyond the levers and secured at one set of ends to the bolts and connected at their other ends with the levers.

13. In combination with a vehicle body and a supporting member, two horizontally extending levers of the first class pivoted together substantially along a central longitudinal line of the vehicle body, means connecting one set of arms of the levers with the supporting member, and springs connecting the other arms of the levers with the vehicle body.

14. In combination with a vehicle body and a supporting member, two levers each provided with horizontally extending arms, an arm of each lever being disposed substantially in the same vertical plane as the other arm of the other lever, means connecting one set of arms of the levers with the supporting member, and vertically disposed springs connecting the other arms of the levers with the vehicle body.

15. In a vehicle spring, a vehicle body, two transversely disposed supporting means connected with an axle one at each side of the vehicle body, and means connecting each of the supporting means with a side of the vehicle body which is opposite the side at which the supporting means is connected with the axle.

16. In combination with an axle and a vehicle body, a cradle in which the body is suspended, two transverse levers, means connecting one set of arms of the levers with the ends of the axle, bolts secured to the cradle at the sides of the body and slidably connected with the arms of the levers, and springs disposed around the bolts and connected with the cradle and the levers.

17. In combination with a vehicle body and an axle, a cradle in which the body is suspended, two transverse levers, means connecting one set of arms of the levers with the ends of the axle, bolts secured to the cradle at the sides of the body and slidably connected with and extending beyond the other arms of the levers, expansion springs disposed around the bolts and connected with the cradle and the levers, and compression springs disposed around the bolts beyond the levers and secured to one set of ends of the bolts and connected at the other ends with the levers.

In testimony whereof I have signed my name to this specification in the presence of two subscribing witnesses.

LLOYD E. MORROW.

Witnesses:
B. A. HOWARD,
F. E. GILES.